(12) United States Patent
Wobig

(10) Patent No.: US 11,076,712 B2
(45) Date of Patent: Aug. 3, 2021

(54) PORTABLE EQUIPMENT SUPPORT STAND

(71) Applicant: Timothy D Wobig, Irvine, CA (US)

(72) Inventor: Timothy D Wobig, Irvine, CA (US)

(*) Notice: Subject to any disclaimer, the term of this patent is extended or adjusted under 35 U.S.C. 154(b) by 0 days.

(21) Appl. No.: 16/943,130

(22) Filed: Jul. 30, 2020

(65) Prior Publication Data

US 2021/0030181 A1 Feb. 4, 2021

Related U.S. Application Data

(60) Provisional application No. 62/880,710, filed on Jul. 31, 2019.

(51) Int. Cl.
| | |
|---|---|
| *A47G 25/06* | (2006.01) |
| *F16M 11/20* | (2006.01) |
| *F16M 11/22* | (2006.01) |
| *F41H 1/02* | (2006.01) |
| *F16M 11/38* | (2006.01) |

(52) U.S. Cl.
CPC ..... *A47G 25/0664* (2013.01); *F16M 11/2021* (2013.01); *F16M 11/22* (2013.01); *F16M 11/38* (2013.01); *F16M 2200/066* (2013.01); *F16M 2200/08* (2013.01); *F41H 1/02* (2013.01)

(58) Field of Classification Search
CPC ........... A47G 25/0664; A47G 25/0685; F16M 11/2021; F16M 11/22; F16M 2200/066; F16M 11/38; F16M 2200/08; F41H 1/02; A47F 5/04; A47F 5/13; F41A 23/18
USPC ...................................................... 211/85.3
See application file for complete search history.

(56) References Cited

U.S. PATENT DOCUMENTS

| | | | | |
|---|---|---|---|---|
| 459,583 | A * | 9/1891 | Johnson ................. | A47G 25/32 248/340 |
| 863,820 | A * | 8/1907 | Wingert ............. | A47G 25/0671 223/90 |
| 1,729,395 | A * | 9/1929 | Mandel ............. | A47G 25/0664 211/172 |
| 1,973,521 | A * | 9/1934 | Bullard ............. | A47G 25/0664 211/172 |
| 2,631,802 | A * | 3/1953 | Tunis ........................ | A47F 5/06 248/150 |
| 4,215,839 | A * | 8/1980 | Gibran ................... | F16M 11/16 248/170 |
| 4,366,940 | A * | 1/1983 | Vargas ................. | F16M 11/046 248/170 |
| 4,988,064 | A * | 1/1991 | Hoshino ............ | F16M 11/2057 248/170 |
| 5,072,910 | A * | 12/1991 | May ........................ | F16M 11/10 248/412 |

(Continued)

*Primary Examiner* — Ko H Chan
(74) *Attorney, Agent, or Firm* — Gutwein Law; Greg N. Geiser

(57) ABSTRACT

Described herein is a portable equipment support stand configured for movement from a first collapsed position to a second extended position. The equipment support stand includes a generally columnar housing for the movable receipt of a pair of arms and at least three legs configured to support the housing in an upright position when placed upon a surface. The support stand is generally configured to provide a structure to allow a user to hang a plurality of protective items when not in use. The device is generally configured for transport and portability and provided in a structure to support heavy items such as body armor.

13 Claims, 10 Drawing Sheets

(56) References Cited

U.S. PATENT DOCUMENTS

| | | | | |
|---|---|---|---|---|
| 5,222,705 | A * | 6/1993 | Gibran | F16M 11/04 |
| | | | | 248/170 |
| 5,819,961 | A * | 10/1998 | Harris | A47G 25/0671 |
| | | | | 211/196 |
| 6,659,409 | B2 * | 12/2003 | Ashjaee | G01C 15/06 |
| | | | | 248/170 |
| 6,702,129 | B1 * | 3/2004 | Harris | A47G 25/0664 |
| | | | | 211/172 |
| 7,165,689 | B2 * | 1/2007 | McDaniel | A47B 96/061 |
| | | | | 211/116 |
| 7,703,725 | B2 * | 4/2010 | May | F16M 11/245 |
| | | | | 248/163.1 |
| 8,322,666 | B2 * | 12/2012 | Duemmel | F16M 11/245 |
| | | | | 248/166 |
| 8,418,860 | B2 * | 4/2013 | Rimmer | D06F 57/04 |
| | | | | 211/85.7 |
| 8,664,500 | B2 * | 3/2014 | Shimada | F16M 11/28 |
| | | | | 84/421 |
| 9,624,949 | B2 * | 4/2017 | Caroom | F16M 11/242 |
| 10,401,001 | B2 * | 9/2019 | Kennedy | A61B 1/0684 |
| 10,851,976 | B2 * | 12/2020 | Proeber | H01B 7/226 |
| 2003/0164348 | A1 * | 9/2003 | Seng | D06F 57/04 |
| | | | | 211/196 |
| 2009/0071922 | A1 * | 3/2009 | Barra | F16M 11/046 |
| | | | | 211/85.3 |
| 2010/0187760 | A1 * | 7/2010 | Hilbert, Jr. | A63B 67/10 |
| | | | | 273/332 |
| 2013/0037503 | A1 * | 2/2013 | Cimino | A47G 25/0664 |
| | | | | 211/85.3 |

* cited by examiner

PORTABLE EQUIPMENT SUPPORT STAND

CROSS-REFERENCE TO RELATED APPLICATION

This U.S. patent application claims priority to U.S. Provisional Application: Application No. 62/880,710 filed Jul. 31, 2019, the disclosure of which is considered part of the disclosure of this application and is hereby incorporated by reference in its entirety.

FEDERALLY SPONSORED RESEARCH OR DEVELOPMENT

Not Applicable

SEQUENCE LISTING, A TABLE, OR A COMPUTER PROGRAM

Not Applicable

FIELD OF THE INVENTION

The device of the present disclosure relates generally to a collapsible/expandable equipment stand that is provided in a portable assembly. More particularly, the device of the present disclosure is generally configured to be easily assembled and disassembled into an upright stand for the placement and resting support of protective equipment when not in use.

BACKGROUND

For several professions and countless activities, personal protective equipment is utilized to protect the user from injury and ensure safety to a wearer of the equipment. Within the military, this equipment often includes, but is not limited to, helmets, body armor, footwear, ruck sack, backpack, firearms, outerwear, rainwear, and other similar equipment that is worn or carried. Additional professions, such as first responders and law enforcement officers, often utilize similar protective equipment in the form of body armor, firearms, footwear, and outerwear. Within sporting activities, such as, but not limited to, football, hockey, motocross, baseball, hiking, and lacrosse, this equipment often includes various pads, helmets, gloves, protectors, ropes, and implements utilized in practice, competition, and leisure.

During use, this equipment becomes soiled or wet with perspiration or from the elements and requires drying to ensure longevity and comfort for subsequent uses. In a typical locker room environment, this equipment can be hung from hangers or hooks for air drying prior to the next use. Although this is a useful solution for the storage and drying of equipment, often for these professions and activities, a locker room or proper hanging means are not available for proper drying. Accordingly, this equipment is often laid flat for drying or stuffed into an equipment bag where it is unable to adequately dry resulting in soiled, wet, and smelly gear.

Therefore, there is a need within the marketplace for a device that functions as a durable and resilient stand configured to support a plurality of items for hanging for storage and drying after use. This device is specifically configured for easy collapsibility and portability and provided in a compact assembly for travel and transport during use.

SUMMARY OF THE INVENTION

The device of the present disclosure can most generally be described as a portable equipment stand configured for movement from a first collapsed position to a second extended position, wherein the device is small and compact for transport in the collapsed position and self-supported in the extended position to provide a resting and hanging surface for the storage of items after use. The device is configured from robust materials and provided in an assembly that is configured to support items weighing up to one hundred (100) pounds. Although 100 pounds is the target weight for supporting items, the device can be configured through alternate materials to support more weight or less weight without departing from the spirit of the invention.

In the preferred embodiment of the present disclosure, the assembly is comprised of a columnar housing having a plurality of channels for supporting at least a pair of arms and at least three legs with each arm and each leg movable and adjustable to a fixed position within the plurality channels from the first position generally parallel to a height of the housing to the second position generally perpendicular the height of the housing. Preferably, the assembly includes a means to enable the pair of arms and the at least three legs to be embedded within an interior portion of the housing and locked into the corresponding first and second positions and positions in between the first and second positions, wherein an exterior portion of the housing retains a flush appearance when in the first position. To preserve weight, the housing is preferably configured from a pair of molded halves in the form of a first half and a second half affixed together to form the structure of the columnar housing.

The columnar housing having a first end and a second end opposed the first end with a distance between the first end and the second end defining a height of the columnar housing. The housing generally defining an interior space aligned with the plurality of channels, wherein the interior space provides a hollow-like cavity for the positioning of the pair of arms and at least three legs when in the first position. Each arm of the pair of arms having an attached end and a free end with the attached generally positioned at a central portion of the interior adjacent to the first end. Each of the attached ends generally positioned in adjacency and movably received within the interior about an axis of rotation, wherein the attached end is hingedly received about the axis and movable from the interior to an exterior of the device. In the preferred assembly, each arm attached end has an aperture configured to receive a fastener for securing the attached end to its central position within the interior and wherein this fastener functions as the axis of which each arm rotates about. Each of the attached ends may include a locking surface configured for engagement with a tab of the housing interior to lock the arm in place at the first and second position.

In the preferred embodiment, the device is depicted with four separate legs positioned at opposed sides of a rectangular shaped columnar housing. Although four legs is preferred, the device can be constructed of different columnar shapes as long as at least three legs are provided for stability. Each leg of the at least three legs is movable within a corresponding channel and comprised of a first leg member and a second leg member in a hinged and movable coupling, wherein the first leg member has a first end movable within the channel and a second end hingedly coupled to a first end of the second leg member with a second end of the second leg member hingedly affixed in a coupling at the second end of the columnar housing.

Accordingly, the at least three legs are generally configured to form a triangular shape in the second extended position. Further, it can be better understood when the first leg member is generally seen as a supporting member for the second leg member which extends perpendicular to the housing and adjacent to the surface the device is placed upon to function as a leg. The first end of the first leg member is generally coupled within the channel and locked into place through a sliding and locking cam member. The sliding and locking cam allows each leg to be independently positioned within the channel, wherein the position of the legs along the height can be adjusted to compensate for uneven ground surfaces. The second end of the first leg member and the first end of the second leg member are in a hinged coupling through the use of corresponding apertures and fasteners to ensure a robust movable connection.

The first end of the first leg member may include a recess to further enhance aesthetics and provide a resting cavity for the location of a handle to actuate the sliding and locking cam between a locked and unlocked position. In the preferred disclosure of the present invention, the handle and sliding locking cam mechanism is a quick release cam locking handle and mechanism as is known in the prior art. This type of assembly provides a robust and durable assembly that can be easily operated and adjusted to a variety positions within the channel.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

Figure 1:
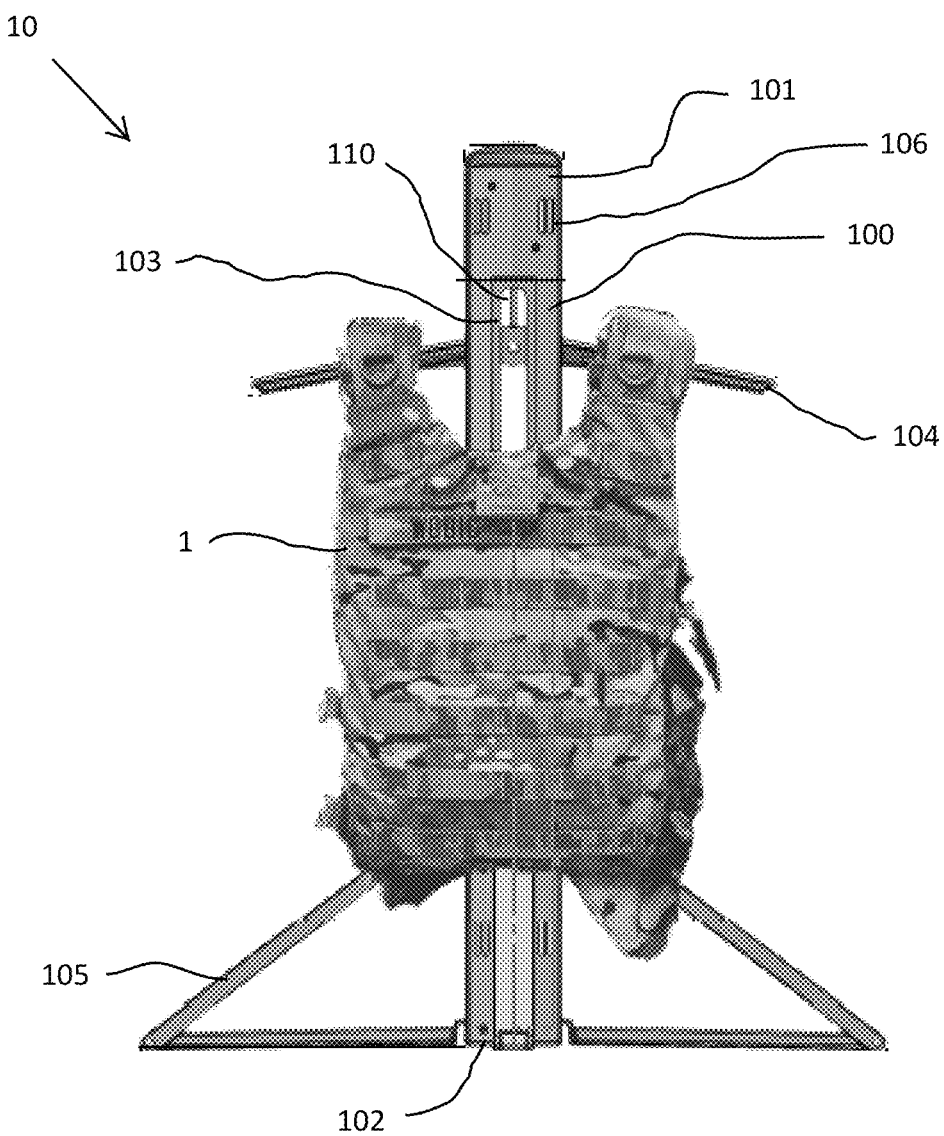
FIG. 1 is a side view of the device in use, according to the present disclosure.

The following detailed description includes references to the accompanying figures, which form a part of the detailed description. The figures show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful and is not intended to exclude other embodiments from the scope of the invention.

As used herein, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The invention of the present disclosure is most generally configured as a supporting stand movable from a collapsed position for travel and transport to an extended position to provide resting support for the draping or hanging of various items of equipment, such as, but not limited to protective equipment. It is generally understood that a device of this type with have significant usefulness for the hanging and drying of protective equipment used by the military and first responders. Accordingly, the device is provided in a robust and durable assembly and configured to specifically support the weight of tactical items, including, but not limited to, body armor. As the device of the present disclosure is anticipated for this use, particular attention to materials and material properties was examined to provide both a lightweight assembly for transport and sufficient strength to support large loads. Accordingly, these materials include, but are not limited to, metals, thermoplastics, structural foams, carbon fibers, and other similar materials.

Figure 2:
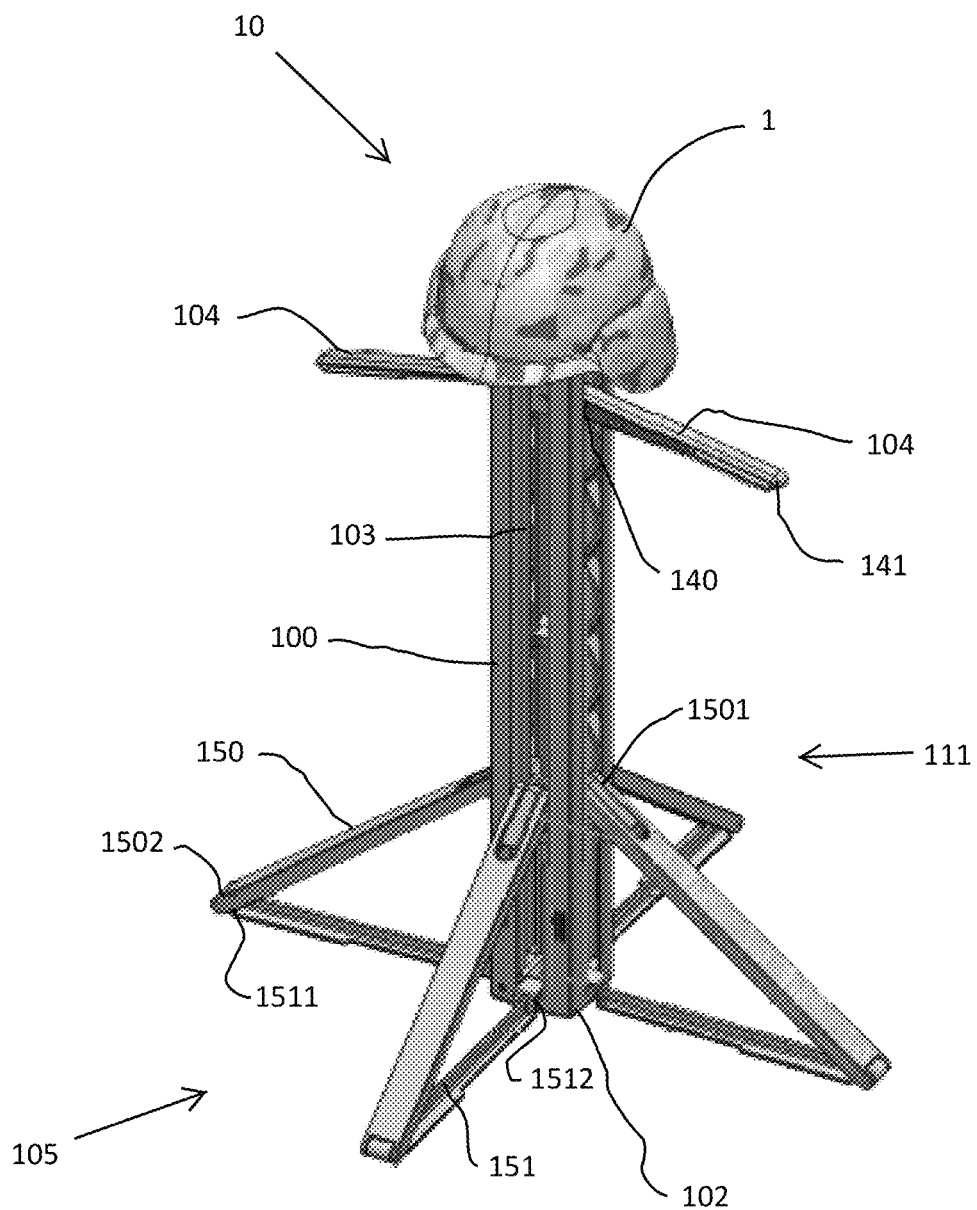
FIG. 2 is an isometric view of the device in use, according to the present disclosure.
Figure 3:
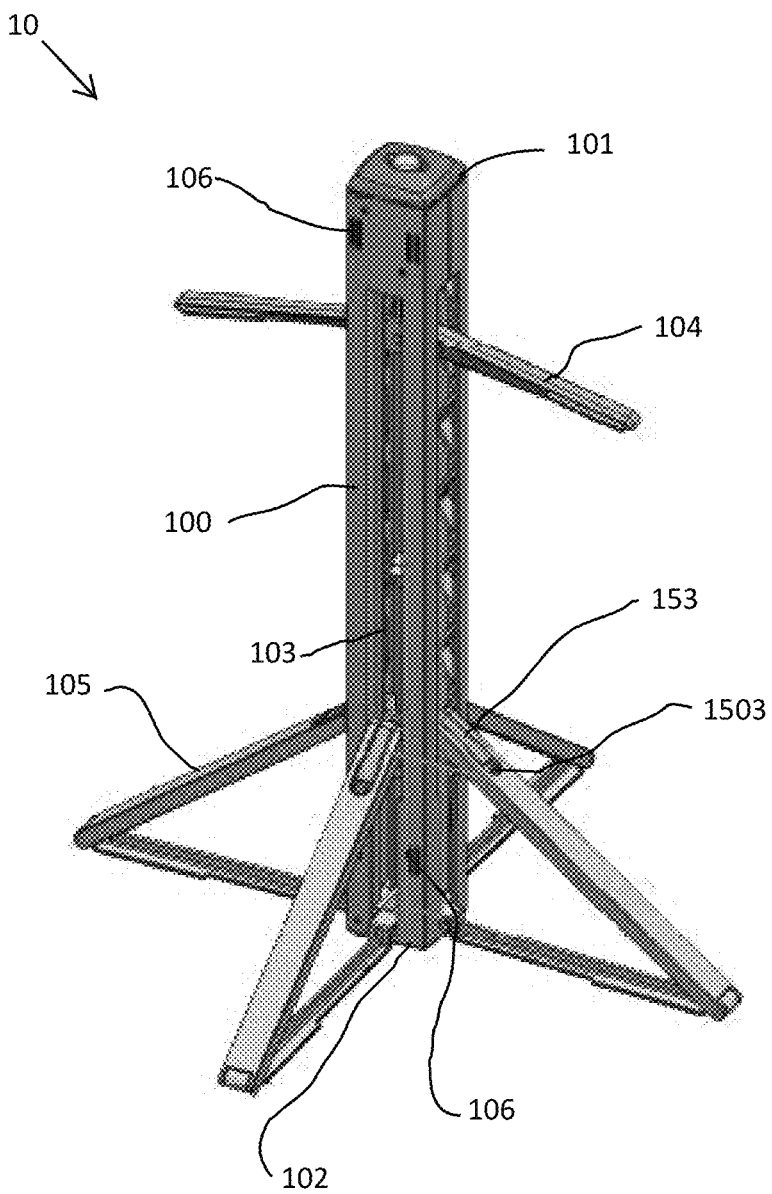
FIG. 3 is an isometric view of the device in the extended position, according to the present disclosure.
Figure 4:
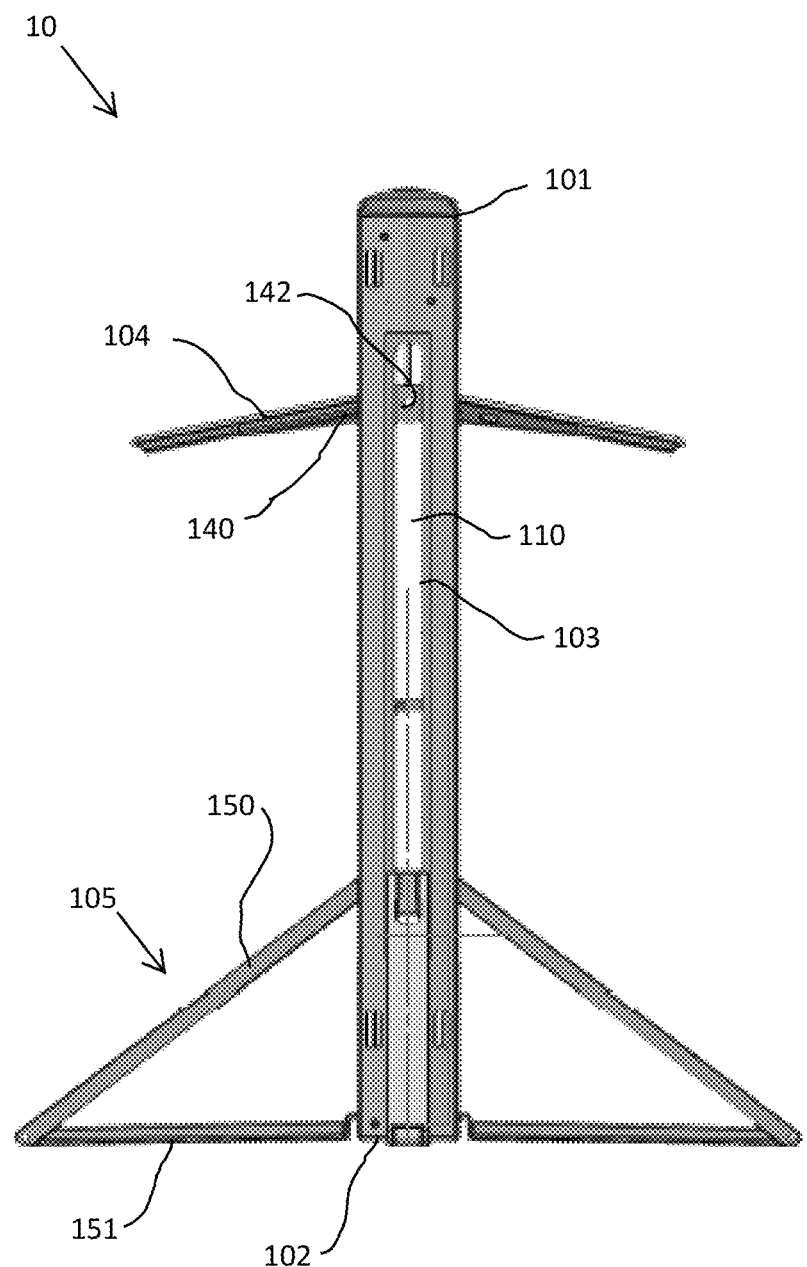
FIG. 4 is a side view of the device in the extended position, according to the present disclosure.
Figure 5:
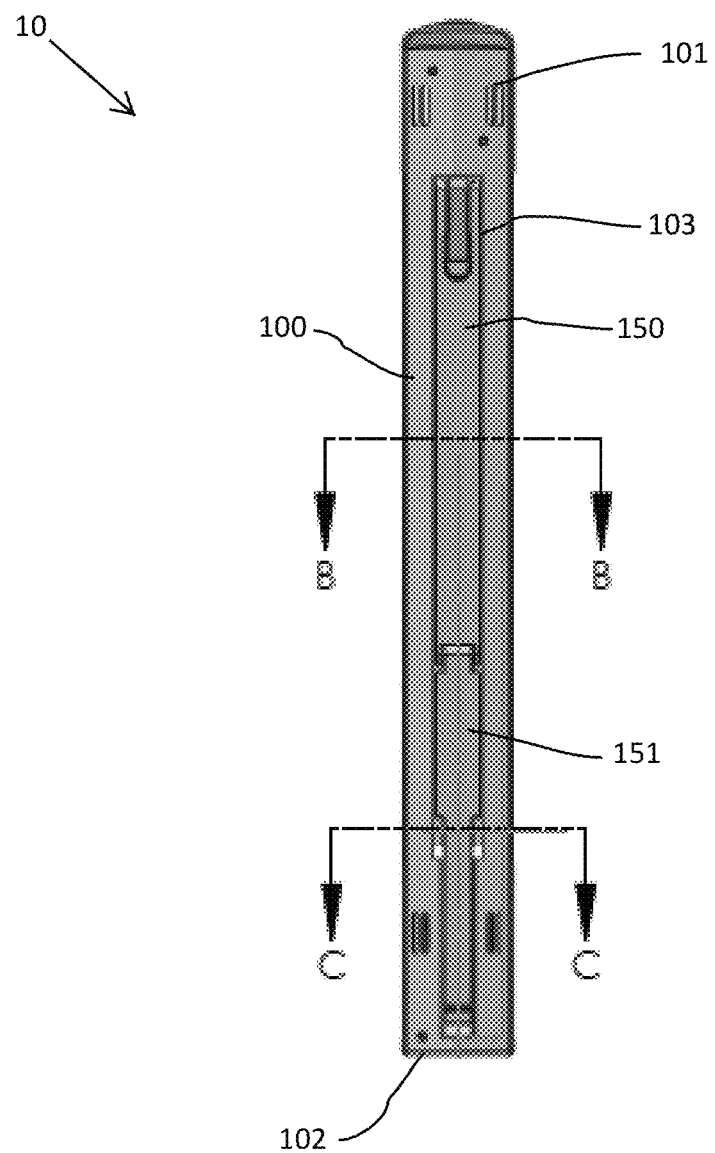
FIG. 5 is a side view of the device in the collapsed position, according to the present disclosure.
Figure 6:
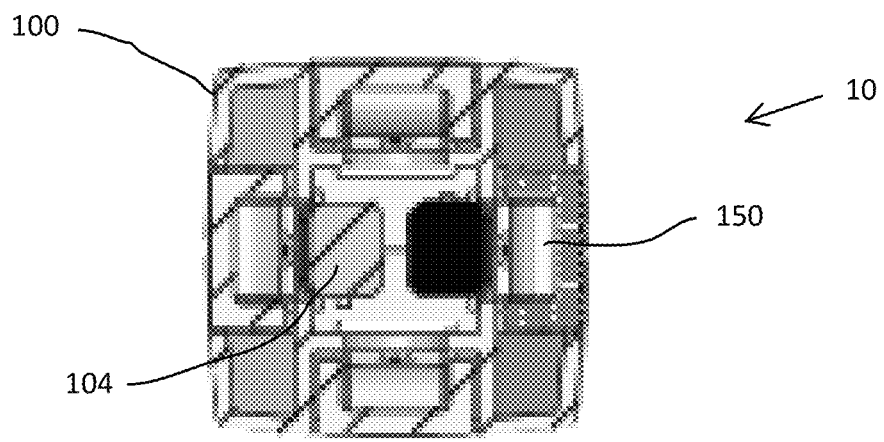
FIG. 6 is an end view of the device along section line B-B of FIG. 5, according to the present disclosure.
Figure 7:
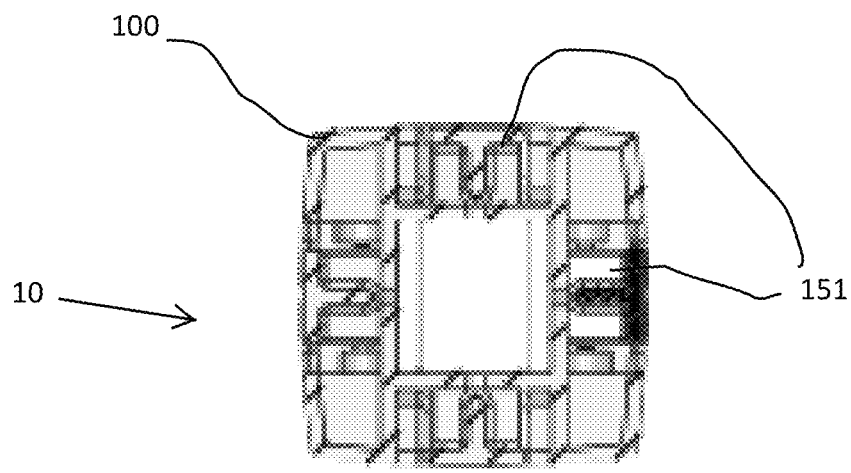
FIG. 7 is an end view of the device along section line C-C of FIG. 5, according to the present disclosure.
Figure 8:
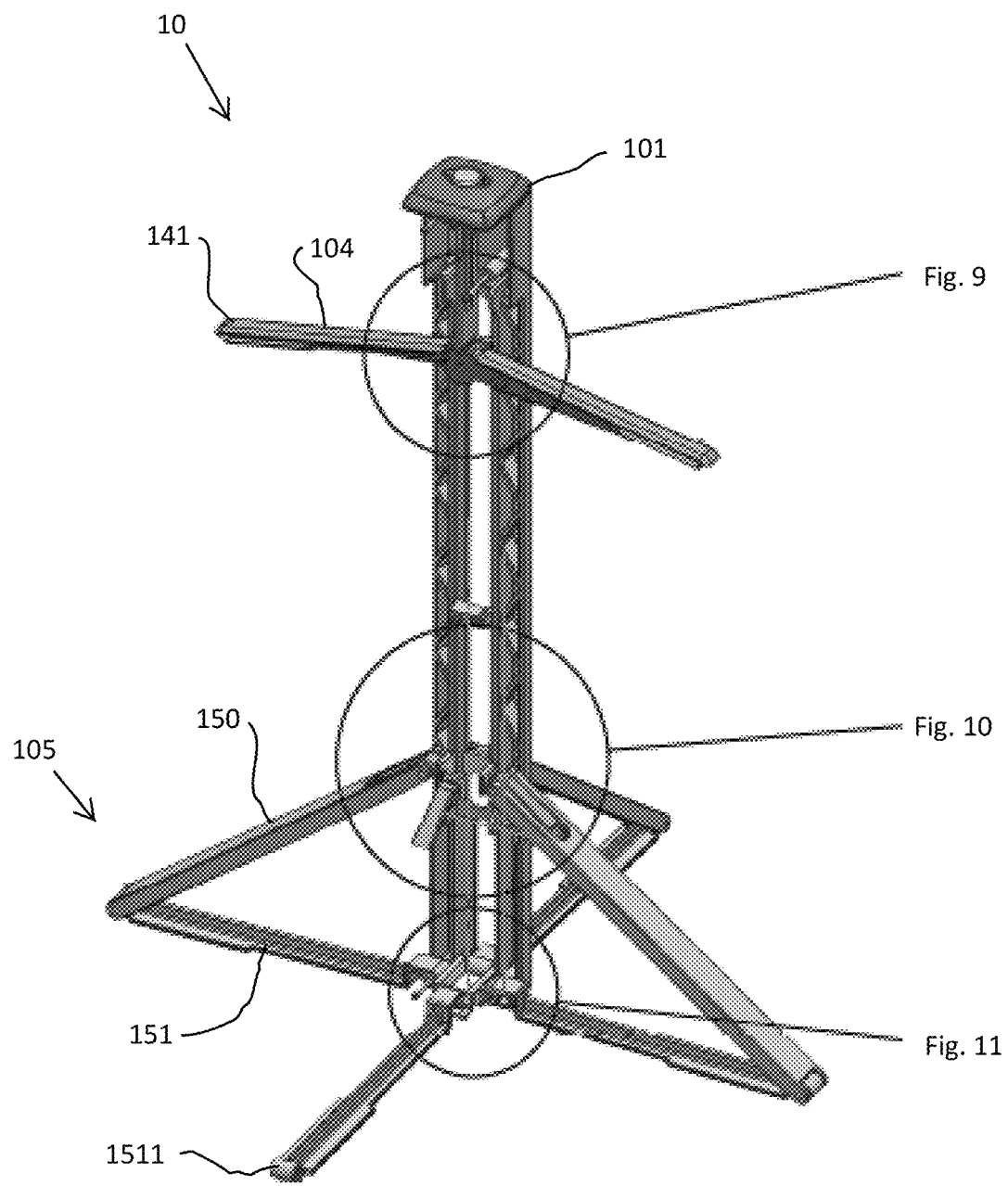
FIG. 8 is a sectional isometric view of the device in the extended position, according to the present disclosure.
Figure 9:
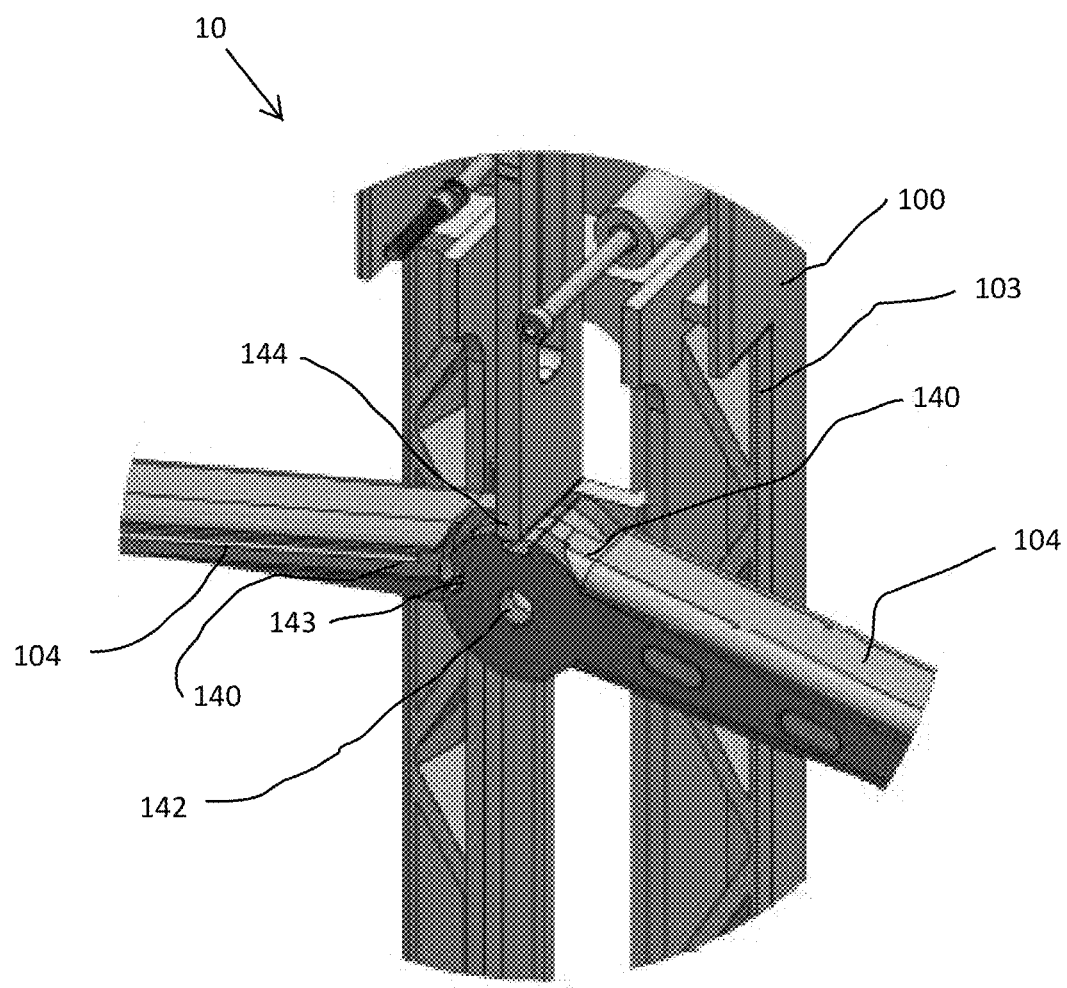
FIG. 9 is an exploded close-up sectional view of the upper portion of the device, according to the present disclosure.
Figure 10:
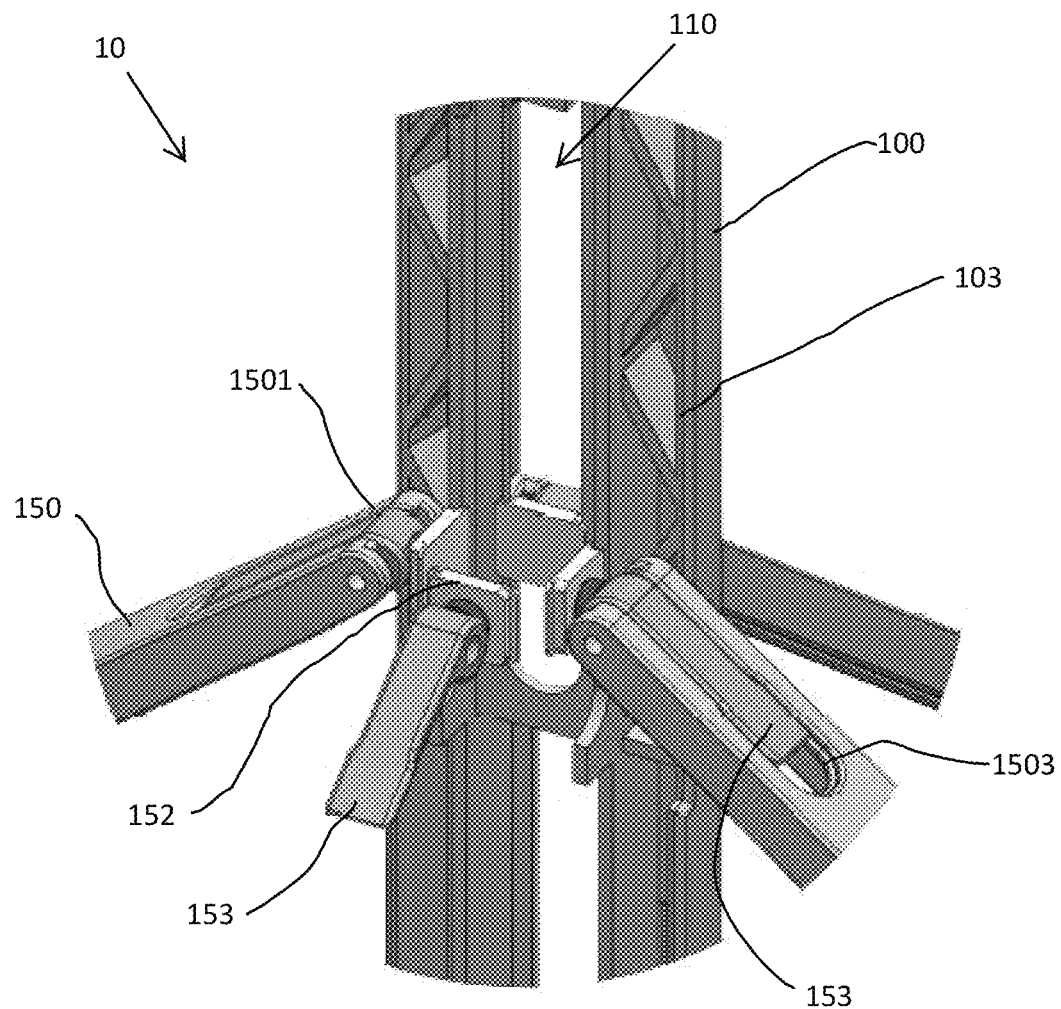
FIG. 10 is an exploded close-up sectional view of the coupling of the first leg members, according to the present disclosure.
Figure 11:
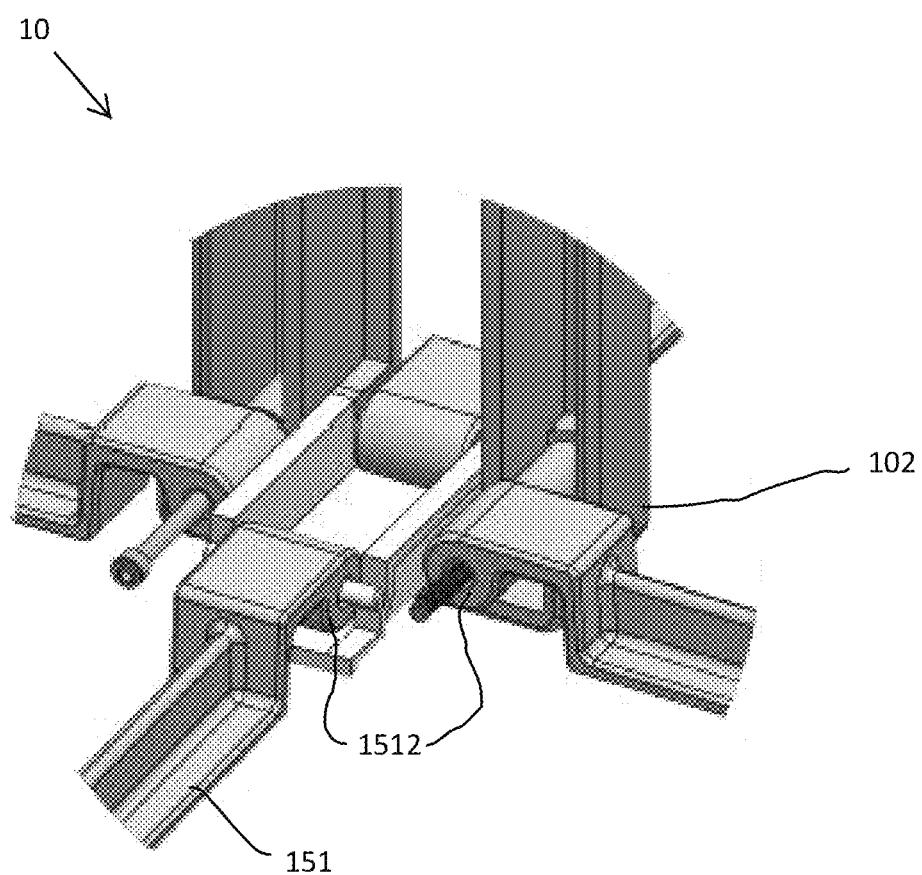
FIG. 11 is an exploded close-up sectional view of the coupling of the second leg members, according to the present disclosure.

Referring now specifically to FIGS. 1-11 of the various views of the portable equipment support stand, generally referred to as device 10. The device 10 is configured for movement from a first collapsed position to a second extended position, wherein the device 10 is compacted for transport in the first collapsed position and self-supported in the second extended position to provide a resting and hanging surface for the storage of items 1. The device 10 is constructed from robust materials and provided in an assembly that is configured to support items 1 weighing up to one hundred (100) pounds. Although 100 pounds is the target weight for supporting items 1, the device 10 can be configured through the use of different and alternate materials to support more weight or less weight without departing from the spirit and scope of the invention.

In the preferred embodiment of the present disclosure, the device 10 is comprised of a columnar housing 100 having a first end 101 and a second end 102, with a distance between the first end 101 and the second end 102 defining a height of the housing 100. The housing 100 includes a plurality of channels 103 generally extending a substantial portion of the height and providing a recess for the attachment of at least a pair of arms 104 and at least three legs 105 with each arm 104 and each leg 105 movable within the plurality of channels 103 between the first collapsed position and the second extended position.

In the first collapsed position of the device 10, the arms 104 and legs 105 are positioned within the housing 100 plurality of channels 103 at a position generally parallel to the height of the housing 100. In the second extended position of the device 10, the arms 104 and the legs 105 are positioned generally perpendicular the height of the housing 100. Preferably, the assembly of the device 10 includes a means to enable the pair of arms and the at least three legs to be embedded within an interior portion 110 of the housing 100 and locked into the corresponding first and second positions, wherein an exterior portion 111 of the housing 100 retains a flush appearance when the arms 104 and legs 105 are positioned at the first collapsed position. To preserve weight, the housing 100 is preferably configured from a pair of molded halves in the form of a first half and a second half affixed together to form the structure of the columnar housing 100.

The interior space 110 is aligned with the plurality of channels 103, wherein the interior space 110 provides a hollow-like cavity for the positioning and storage of the pair of arms 104 and at least three legs 105 when in the first position within the interior space 110.

Each arm 104 of the pair of arms 104 having an attached end 140 and a free end 141 with the attached end 140 generally positioned at a central portion of the interior space 110 and adjacent to the first end 101 of the housing 100. Each of the attached ends 140 are generally positioned in adjacency and movably received within the interior 110 about an axis of rotation, wherein the attached end 140 is hingedly received about the axis and movable from the interior 110 to the exterior 111 of the device 10. In the preferred assembly, each arm 104 attached end 140 has an aperture 142 configured to receive a fastener (not pictured) for securing the attached end 140 to its central position within the interior 110 and wherein this fastener functions as the axis of which each arm 104 rotates about.

Further, each of the attached ends 140 may include a locking surface 143 configured for engagement with a tab 144 of the housing 100 interior 110 structure to lock the corresponding arm 104 at the first collapsed position or the second extended position.

In the preferred embodiment, the device 10 is depicted with four separate legs 105 positioned at opposed sides of a rectangular shaped columnar housing 100. Although four legs 105 is preferred, the device 10 can be constructed of different columnar shapes as long as at least three legs 105 are provided for stability. Each leg 105 of the at least three legs 105 is movable within a corresponding channel 103 of the plurality of channels and comprised of a first leg member 150 and a second leg member 151 in a hinged and movable coupling, wherein the first leg member 150 has a first end 1501 movable within the corresponding channel 103 and a second end 1502 hingedly coupled to a first end 1511 of the second leg member 151 with a second end 1512 of the second leg member 151 hingedly affixed in a coupling at the second end 102 of the columnar housing 100.

Accordingly, the at least three legs 105 are generally configured to form a triangular shape when moved and fixed in the second extended position. Further, it can be better understood when the first leg member 150 is generally seen as a supporting member for the second leg member 151 which extends perpendicular to the housing 100 height and adjacent to the surface the device is placed upon to provide resting support on the surface for supporting the housing 100 in a vertical direction relative to the surface the device 10 is placed upon. The first end 1501 of the first leg member 150 is generally coupled within the channel 103 and locked into place through a sliding and locking cam member 152. This sliding and locking cam member 152 enables for securing within the channel 103 along a multitude of positions along the height of the device 10. The second end 1502 of the first leg member 150 and the first end 1511 of the second leg member 151 are in a hinged coupling through the use of corresponding apertures and fasteners to ensure a robust movable connection. Accordingly, each leg 105 can be adjusted to an independent second position along the height, wherein the device 10 is able to placed at substantially perpendicular position relative to a surface the device 10 is placed upon by moving each leg 105 into a desired position. This configuration accommodates use of the device 10 on uneven surfaces or varying terrain types.

The first end 1501 of the first leg member 150 may include a recess 1503 to further enhance aesthetics and provide a resting cavity for the location of a handle 153 to actuate the sliding and locking cam member 152 between a locked and unlocked position. In the preferred disclosure of the present invention, the handle 153 and sliding locking cam member 152 is a quick release cam locking handle and mechanism as is known in the prior art. This type of assembly provides a robust and durable assembly that can be easily operated and adjusted to secure the at least three legs 105 to their desired position across multiple positions along the height to support level placement on uneven surfaces.

The housing 100 may further include a plurality of apertures 106 configured to allow for the attachment of a strap member (not pictured) to aid a user in carrying the device 10 in the first collapsed position or for securing to a pack or other structure. Accordingly, the device 10 can be lashed or affixed onto a person or vehicle for easy transport.

In use, a user of the device 10 would manipulate the pair of arms 104 and at least three legs 105 between the first collapsed position and a desired second extended position depending upon a given need. Accordingly, within the first collapsed position, the user will fold or move the arms 104 into the housing 100 interior and secure the arms 104 within this position and additionally fold or move the legs 105 into the housing 100 interior 110 and secure. Within the second extended position, the user will reverse the process and move the arms 104 and legs 105 to the extended position generally perpendicular to the height of the housing 100, lock into place and then store items 1 onto the device 10 for drying and storing.

The use of the device 10 allows the user to quickly and easily stow gear and items 1 when not worn in an upright and ready position and quickly and easily retract the device 10 the first collapsed position for transport.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A portable equipment support stand having a first position configured for transport of the equipment support stand and movable to a second position configured to support the equipment support stand in a generally upright position for supporting items for hanging, the support stand comprising:
   a columnar housing, the columnar housing having a height between a first end and a second end and defining an interior space;
   a pair of arms, each arm of the pair of arms received within the interior space at a central position to the columnar housing, wherein each arm of the pair of arms is generally parallel to the height of the housing and within the interior space in the first position and movable to the second position with each arm of the pair of arms generally perpendicular to the housing at an exterior of the columnar housing; and
   at least three legs movably coupled to the columnar housing, each leg of the at least three legs movable between the first position parallel to the height of the housing and an independent position along the height of the columnar housing at the second position, wherein each leg of the at least three legs overlaps the pair of arms in the first position and is independently movable to a multitude of positions and secured along the height to support the housing in an upright direction relative to a surface the at least three legs are positioned upon in the second position.

2. The portable equipment stand of claim 1, wherein each leg of the at least three legs is received within the interior of the housing in the first position.

3. The portable equipment stand of claim 1, wherein the columnar housing is rectangular in shape.

4. The portable equipment stand of claim 3, wherein the support stand includes four legs.

5. The portable equipment stand of claim 1, wherein the columnar housing is comprised of a first half and a second half in a mated assembly.

6. A portable equipment support stand adapted to support items for hanging, the support stand having a first position for transport and second position for supporting the hanging of items, the portable equipment support stand comprising:
   a columnar housing, the housing comprising:
   a first end;
   a second end opposed the first end, a distance between the first end and the second end defining a height of the columnar housing;
   an interior space, the interior space being generally a hollow cavity;
   a plurality of channels extending a substantial portion of the height and providing access to the interior space from an exterior position of the portable stand;
   a pair of arms movably received within the interior space at a central position and aligned with at least two channels of the plurality of channels adjacent the first end, each arm of the pair of arms movable between the first position with each arm of the pair of arms parallel to the height of the housing within the interior space and the second position with each arm of the pair of arms generally perpendicular to the housing and extending to the exterior of the portable stand; and
   at least three legs movably received within the at least two channels and an additional channel of the plurality of channels adjacent the second end, each leg of the at least three legs movable between the first position with each leg of the at least legs positioned parallel to the height of the housing and overlapping the pair of arms and an independent position along the height of the columnar housing within each channel of the at least three channels at the second position, wherein each leg of the at least three legs is independently movable to a multitude of positions along the height to support the housing in an upright direction relative to a surface the at least three legs are positioned upon.

7. The portable equipment stand of claim 6, wherein each leg of the at least three legs is received within the interior of the housing in the first position.

8. The portable equipment stand of claim 6, wherein the columnar housing is rectangular in shape.

9. The portable equipment stand of claim 8, wherein the support stand includes four legs received within four separate channels of the plurality of channels.

10. The portable equipment stand of claim 6, wherein the columnar housing is comprised of a first half and a second half in a mated assembly.

11. A portable equipment support stand adapted to support items for hanging having a first position for transport and a second position for supporting items, the support stand comprising:
   a columnar housing, the columnar housing comprising:
   a first end;
   a second end opposed the first end, the distance between the first end and the second end defining a height of the columnar housing;
   an interior space, the interior space extending the height of the columnar housing;
   a plurality of channels extending a substantial portion of the height and aligned with the interior space;
   a pair of arms, each arm of the pair of arms having an attached end and a free end, the attached end having a locking surface configured for engagement with a tab in the interior space at a central position in the first position, each arm of the pair of arms movably received with at least two channels of the plurality of channels adjacent the first end, each arm of the pair of arms movable between the first position with each arm of the pair of arms parallel to the height of the housing within the interior space and a position generally perpendicular to the housing at an exterior of the columnar housing at the second position; and
   at least three legs movably received within at least three channels of the plurality of channels adjacent the second end, each leg of the at least three legs comprising:
   a first leg member;
   a second leg member hingedly coupled to the first leg member; and
   a locking cam member, the locking cam member on a first end of the first leg member, wherein the first leg member and the second leg member are movable between the first position with the first leg member and second leg member parallel to the height of the housing and an independent position along any portion of the height of the columnar housing within each channel of the at least three channels in the second position, wherein each leg the at least three legs is independently movable and secured to a multitude of positions along the height to support the housing in an upright direction relative to a surface the at least three legs are positioned upon and wherein the at least three legs overlap the pair of arms in the first position.

12. The portable equipment stand of claim 11, wherein the columnar housing is rectangular in shape.

13. The portable equipment stand of claim 12, wherein the support stand includes four legs.

* * * * *